United States Patent [19]

Harrison

[11] Patent Number: 4,854,374
[45] Date of Patent: Aug. 8, 1989

[54] TEMPERATURE CONTROLLING APPARATUS

[76] Inventor: Frank Harrison, P. O. Box 1824, Kansas City, Mo. 64141

[21] Appl. No.: 151,590

[22] Filed: Feb. 2, 1988

[51] Int. Cl.⁴ .......................... F24H 7/00; F25D 3/00
[52] U.S. Cl. .............................. 165/47; 165/87; 62/406; 62/530; 416/61; 416/62; 416/95; 416/146 R
[58] Field of Search ................. 62/244, 530, 406, 437; 416/62, 146 R, 95, 61, 96 R; 165/86, 87, 47

[56] References Cited

U.S. PATENT DOCUMENTS

| | | | |
|---|---|---|---|
| 662,541 | 11/1900 | Miskolczy | 62/530 |
| 664,776 | 12/1900 | Porter . | |
| 702,994 | 6/1902 | Porter . | |
| 1,260,194 | 3/1918 | Higgins . | |
| 1,667,944 | 5/1928 | Nichols . | |
| 1,858,226 | 5/1932 | Hlavaty . | |
| 1,869,855 | 8/1932 | Le Grand . | |
| 1,903,471 | 4/1933 | Murphy . | |
| 2,501,038 | 3/1950 | Fransson | 416/95 |
| 2,650,803 | 9/1953 | Rosskopf . | |
| 2,720,013 | 10/1955 | Clarke | 416/146 R |
| 2,982,522 | 6/1957 | Hamilton et al. . | |
| 3,020,025 | 2/1962 | O'Mara . | |
| 3,253,649 | 5/1966 | Laing . | |
| 3,285,330 | 11/1966 | Root 3rd . | |
| 3,612,168 | 10/1971 | Peterson . | |
| 3,738,771 | 6/1973 | Delarbre et al. | 416/96 R |
| 4,326,833 | 4/1982 | Zelahy et al. | 416/96 R |
| 4,751,827 | 6/1988 | Villareal | 62/530 |
| 4,761,314 | 8/1988 | Marshall | 62/530 |

FOREIGN PATENT DOCUMENTS

| | | | |
|---|---|---|---|
| 943379 | 3/1949 | France | 416/96 |
| 0224242 | 12/1983 | Japan | 62/406 |

Primary Examiner—Albert W. Davis, Jr.
Assistant Examiner—John K. Ford
Attorney, Agent, or Firm—Hovey, Williams, Timmons & Collins

[57] ABSTRACT

Apparatus for heating or cooling ambient air in the form of a temperature controlling propeller having a plurality of blades arranged around a rotatable hub, the blades carrying cells containing a heat retaining material. The cells are mounted in openings provided in the blades and retained therein. A thermometer may be mounted on the hub to monitor air temperature. The propeller is heated or chilled prior to mounting on a driven shaft. When the propeller is rotated by the shaft, it simultaneously circulates and heats or cools the surrounding air as desired.

7 Claims, 1 Drawing Sheet

TEMPERATURE CONTROLLING APPARATUS

FIELD OF THE INVENTION

Apparatus for generating heated or cooled air includes a propeller having a hub and a plurality of radially extending blades each blade carrying a number of removable, blade-mounted heating or cooling cells. As the propeller rotates, the surrounding ambient air is driven past the propeller blades, gaining or losing heat through convection to the blade-mounted cells.

DESCRIPTION OF THE PRIOR ART

The desirability of cooling or heating ambient air by a rotary radiator has been previously recognized. One such device was an air cooling apparatus described in U.S. Pat. No. 702,994. Chilled water or brine was circulated from a base containing ice and salt through the hub and into the hollow blades of the fan, or alternately into hollow pipes forming a screen which cools the air as it passes through. Alternately, this patent shows the blades as hollow and filled with a cooling medium which does not circulate but is retained in the blades until its cooling ability is exhausted and then a new supply substituted. One disadvantage of these prior rotary heating and cooling devices is the coolant circulation system which required effective seals and pumps to circulate the coolant. Another disadvantage lies in the hollow-bladed fan, which is subject to stress and leakage where the blades are connected to the hub and may become dynamically imbalanced during rotation if not completely and evenly filled with coolant.

SUMMARY OF THE INVENTION

The temperature controlling apparatus hereof solves these problems by employing self-contained blade-mounted cells which contain a material preferably having a high specific heat. The cells are individually fitted in the blades of the propeller, and the cells mounted near the radial periphery of each blade. Each cell is made of a deformable synthetic resin material and is approximately spherical in shape. The cells are mounted on the blades by pressing the cell into a circular opening in the blade, thereby biasing the cell against the blade material surrounding the opening. Alternately, detents are provided on the surface of blades at the edges of the openings on the blades which detents hold the cells in their corresponding openings. The entire propeller may then be removed and heated or chilled before replacement on a driven shaft or, in the alternative, the cells may be individually removed from the blades and replaced by cells which have been chilled or heated.

DETAILED DESCRIPTION OF THE DRAWINGS

The temperature controlling apparatus 10 in the overall form of a conventional axial-thrust fan provided with a temperature controlling propeller 12. The propeller 12 is removably mounted on a driven shaft (not shown) connected to a motor 14 at the rear of the apparatus or fan 10. Screen 16 is also mounted on fan 10 and encloses the propeller 12. Pedestal 18 forms the base of the fan 10 and supports the motor 14 a suitable distance above a supporting surface so that the propeller 12 is free to rotate on the shaft without interference from the surface.

Figure 2:
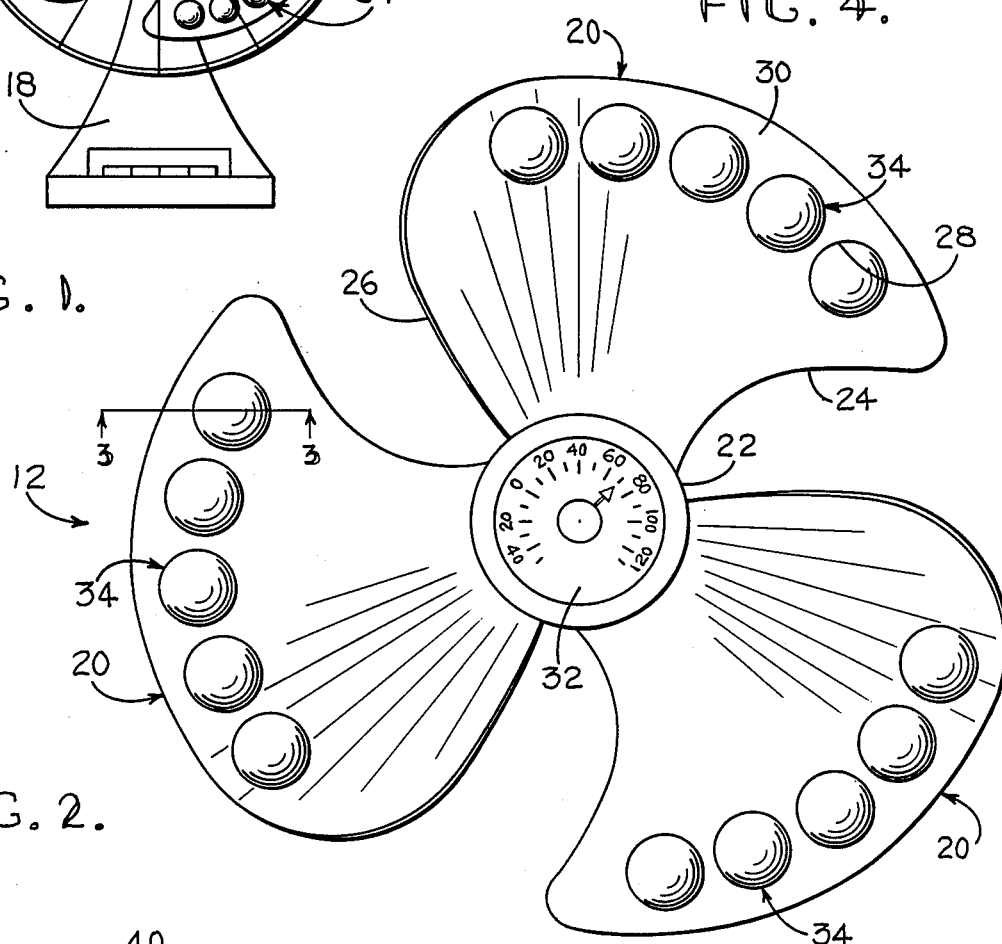
FIG. 2 is an enlarged front elevational view of the propeller showing thermometer mounted on the hub.

The propeller 12 is shown in greater, enlarged detail in FIG. 2. A plurality of blades 20 extend radially from a rotatable hub 22. The hub 22 and blades 20 may be integrally cast or molded of any suitable material such as metal or synthetic resin, or assembled from separate components.

Each blade includes a leading edge 24 which is located in a plane rearwardly of the hub 22 and a trailing edge 26 is located in a plane toward the front of the hub 22. The blades 22 are thus angled from the rear of the hub to the front of the hub as well as extending radially therefrom. Further, both leading edge 24 and trailing edge 26 are curved in the direction of rotation of the propeller 12.

The blades 20 are constructed to provide a series of oepnings 28 therein at the outer marginal edge 30 of each blade. Each opening 28 is generally circular and located an equal radial distance from the hub 22. To maintain appropriate balance of the propeller 12 during rotation, an equal number of openings 28 are provided in each blade 20. A thermometer 32 is mounted on the face of the hub 22, and is preferably circular to ensure dynamic balance during rotation of the propeller.

Figure 3:
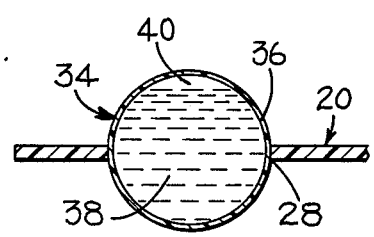
FIG. 3 is a fragmentary sectional view taken along line 3—3 of FIG. 2.

A spherical cell 34 is inserted into each opening 28. Each cell 34 is self-contained and is press fitted into the opening 28 as shown in FIG. 3 whereby to be carried on the fan blade 20. Each cell 34 includes a shell 36 which is preferably made of resilient synthetic resin or other impermeable, elastic material. When a cell 34 is pressed into a corresponding opening 28, the shell 36 deforms slightly to enable it to fit within the slightly smaller sized opening 28, thereby biasing the resilient shell 36 against that portion of the blade 20 surrounding the opening 28.

The interior of the shell 36 is filled with any material 38 which preferably has a high specific heat. The phase change material 38 thus may transfer or absorb great amounts of heat from the surrounding air. Advantageously, the material 38 is liquid at room temperature (20°–22° C.) so that the cells 34 may deform slightly and be held in the opening 28. Thus water having a high specific heat and being liquid at room temperature may be used within the shell 36. A gaseous material 40 also forms a minor component of the contents of the interior of the cell 34 in order to permit the liquid material to expand and contract with the temperature changes without significantly altering the size or shape of the shell 36.

Figure 1:
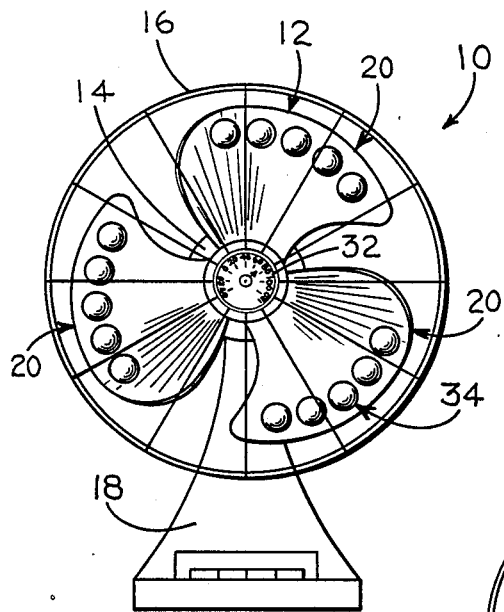
FIG. 1 is a front elevational view of the temperature controlling apparatus showing the propeller mounted on a household fan.
Figure 4:
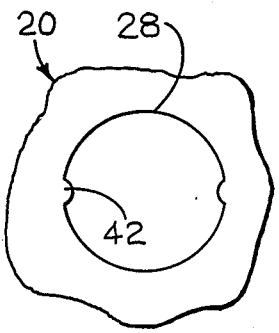
FIG. 4 is a fragmentary view of an alternate embodiment of the opening in the propeller blade showing the detents for attachment of the blade-mounted cells.

FIG. 4 shows an alternate embodiment of the opening 28 wherein the generally circular opening 28 is provided with a pair of opposed detents 42. The detents 42 may deform the surface of the shell 36 to hold the cell 34 in place in the blade 20. Other means such as staking, wiring or the like may be used to hold the cells 34 within their corresponding openings 28.

In operation, the propeller 12 is chilled or heated to regenerate the cells 34 prior to mounting on the shaft of the motor 14. To cool a room, the propeller 12 is placed in a home freezer or other refrigeration source until the liquid material 38 inside each cell 34 solidifies. The propeller 12 is then mounted on the shaft of the motor 14 of the fan 10 by conventional means such as a threaded screw through the side or center of the hub or a snap-fitting from the hub onto the shaft. The motor 14 is then engaged to rotate the propeller 12.

Air is compressed against the blade and then pushed forward as the propeller turns, thereby creating an airflow from the fan 10. As the air passes across the blades 20, heat from the air is absorbed into the cells 34 which have been cooled below ambient air temperature. A cooling breeze is thereby provided not only by the circulation of air but also the absorption of heat from the ambient air through convection into the cells 34.

The propeller 12 may also serve to heat the surrounding air if the propeller 12 is heated prior to mounting on the fan 10. The cells 34, being at a higher temperature than the surrounding air, give up heat and thereby raise the temperature of the air.

It may be appreciated that the thermometer 32 mounted on the hub permits monitoring the temperature of the air in the vicinity of the fan 10. When the cells 34 have absorbed or released heat causing their temperature to approach the ambient air temperature, the propeller 12 may be removed and rechilled or reheated. Alternatively, the propeller 12 may be retained on the shaft and the cells 34 removed for regeneration, thereafter substituting cells 34 which are chilled or heated as desired. Thus, the propeller 12 or individual cells 34 may be cycled to provide continuous cooling or heating to the surrounding air.

The invention has been described in the context of circulating cooled or heated air in a room filled with air, but it may be appreciated the temperature controlling propeller hereof may be used to circulate and heat or cool any fluid.

I claim:

1. Temperature controling apparatus comprising:
   a propeller for a fan having a rotatable hub and a plurality of blades extending radially from the hub, each blade having at least one opening extending therethrough and
   at least one self-contained temperature controlling means having a high heat storage capacity mounted in the opening in each blade whereby said self-contained temperature controlling means can be placed in a hot or cold environment prior to use to regenerate the same.

2. Temperature controlling apparatus as set forth in claim 1 wherein said self-contained temperature controlling means includes at least one hollow cell containing a phase change material therein.

3. Temperature controlling apparatus as set forth in claim 2, wherein each blade has a plurality of cells mounted in opening adjacent the outer marginal edge of said blade.

4. Temperature controlling apparatus as set forth in claim 2, wherein said cells are removably mounted in the openings in said blades.

5. Temperature controlling apparatus as set forth in claim 3 wherein said cells are formed of resilient material for compressible mounting within the openings formed in said blades.

6. Temperature controlling apparatus as set forth in claim 5 wherein said cells are spherical and said openings are circular.

7. Temperature controlling apparatus as set forth in claim 6 wherein a thermometer is mounted on the hub.

* * * * *